United States Patent [19]

Anderson, Sr. et al.

[11] 3,774,563

[45] Nov. 27, 1973

[54] BARGE-LIKE OIL STORAGE VESSEL

[75] Inventors: Lloyd E. Anderson, Sr., Des Moines, Iowa; Richard E. Hills, Coraopolis, Pa.

[73] Assignee: Pittsburgh-Des Moines Steel Company, Pittsburgh, Pa.

[22] Filed: Mar. 16, 1971

[21] Appl. No.: 124,665

[52] U.S. Cl. .............................. 114/0.5 T, 114/74
[51] Int. Cl. ............................................ B63b 25/08
[58] Field of Search ................... 114/0.5 T, 74 T; 9/8 P; 61/46.5

[56] References Cited
UNITED STATES PATENTS
3,507,238   4/1970   Chow ........................... 114/0.5 T Primary Examiner—Trygve M. Blix
Assistant Examiner—Charles E. Frankfort
Attorney—Shoemaker & Mattare

[57] ABSTRACT

An elongate, barge-like oil storage vessel for floating at the surface of a body of water, the vessel being so constructed as to enable water to flow back and forth between an interior of the vessel and the body of water as material to be stored is added to and removed from said vessel, buoyancy means carried by said vessel and of such size and buoyancy as to float said vessel at the surface of the body of water, and mooring means connected to said elongate vessel and enabling said vessel to move in response to changes in wind and currents and the like.

19 Claims, 7 Drawing Figures

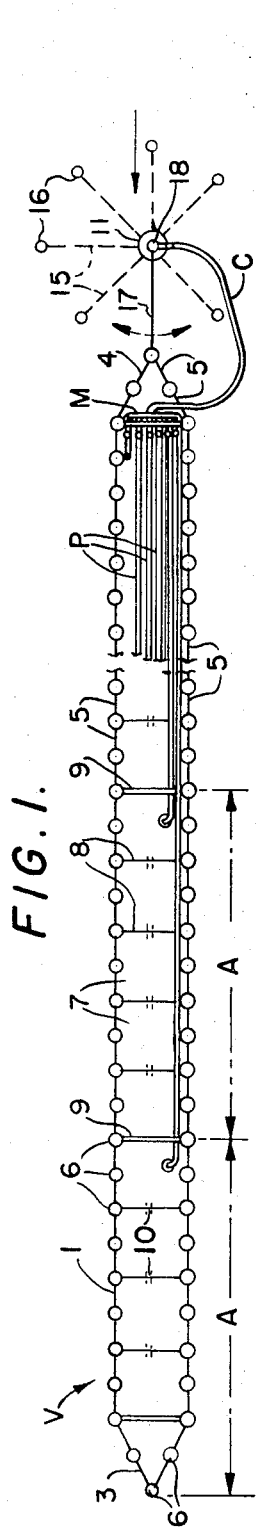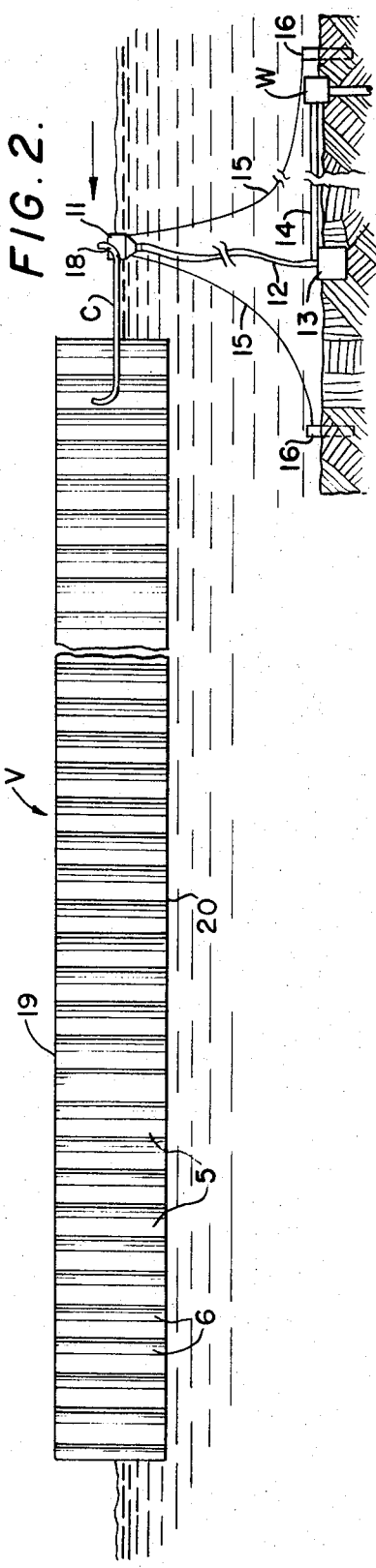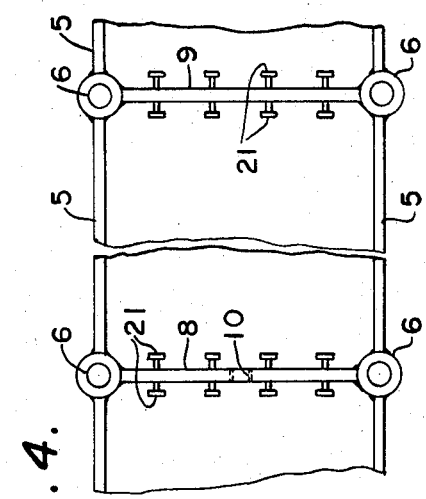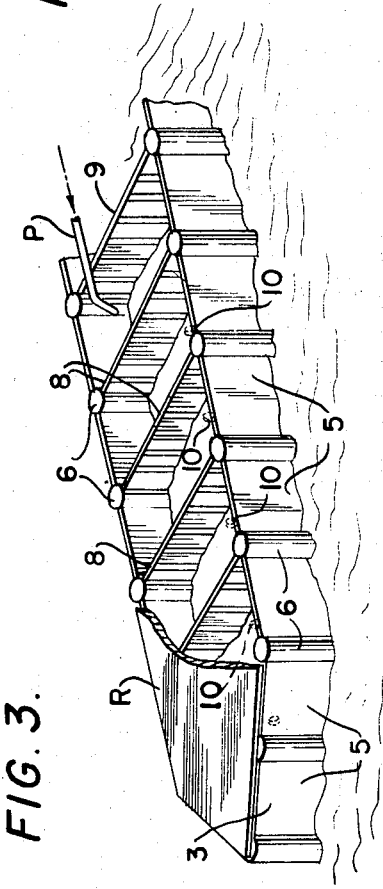
INVENTORS
LLOYD E. ANDERSON, SR. &
RICHARD E. HILLS

INVENTORS
LLOYD E. ANDERSON, SR. &
RICHARD E. HILLS

BY Shoemaker and Mattare

ATTORNEYS

BARGE-LIKE OIL STORAGE VESSEL

BACKGROUND OF THE INVENTION

This invention relates to a barge-like or generally ship-shaped floating liquid storage vessel for storing liquids less dense than water and being immiscible in water, such as crude oil and the like. The storage vessel is positioned in a body of water adjacent a drill site or the like for storing liquid taken from said drill site and eliminates the necessity of providing pipe lines, pump means and the like from said drill site to a shore installation or the like.

The elongate, barge-like floating storage vessel is divided into a plurality of liquid storage compartments preferably having an open top and bottom. Buoyancy means are carried by the vessel for floating said vessel on the surface of the body of water and mooring means are connected to one end of the vessel in a manner to permit said storage vessel to rotate or weather vane in response to changes in wind direction and currents and the like.

The plurality of compartments in one form of the storage vessel are grouped into one or more sections of several compartments interconnected with one another for flow of liquid from one compartment to an adjacent compartment in a section. Division of the storage vessel into a plurality of separate compartments prevents spillage of an excess amount of stored liquid in the event of a collision with said vessel or a leak occurring in one or more of said compartments.

OBJECTS OF THE INVENTION

It is an object of this invention to provide a unique, barge-like floating liquid storage vessel.

Another object of this invention is to provide a floating offshore liquid storage vessel which is adapted to be positioned adjacent a drill site or the like for storing liquid obtained from said drill site, thus eliminating the necessity for pipe lines and pump means and the like for conveying the liquid to a shore installation or the like.

A still further object of this invention is to provide a unique, barge-like floating liquid storage vessel having buoyancy means for floating said container on the surface of a body of water.

It is a still further object of this invention to provide a floating liquid storage vessel which is generally ship-shaped or barge-like and which is moored in position in the body of water by means attached thereto in a manner to enable said vessel to rotate or weather vane in response to changes in wind direction and currents and the like.

Yet another object of this invention is to provide a floating offshore liquid storage vessel which is divided into a plurality of compartments with means for isolating at least some of said compartments from one another whereby excess spillage or leakage of stored liquid from said vessel is avoided in the event of a rupture or leak in one or more of said compartments.

BRIEF DESCRIPTION OF THE DRAWINGS

FIG. 1 is a top schematic view of a storage vessel according to the present invention.

FIG. 2 is a side view of the storage vessel shown in FIG. 1.

FIG. 3 is a top perspective view of a portion of the storage vessel shown in FIGS. 1 and 2.

FIG. 4 is a top view, partly broken away, of the bulkheads in the storage vessel and showing stiffening means thereon.

DETAILED DESCRIPTION OF THE INVENTION

Figure 5:
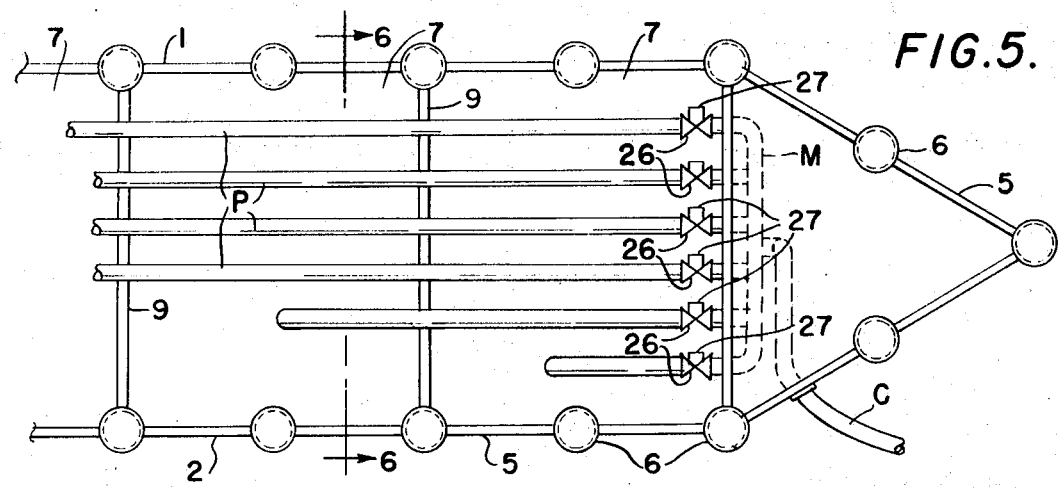
FIG. 5 is a top view of a portion of the vessel shown in FIG. 1 and showing a portion of the piping arrangement for conveying liquid to the various compartments.

Referring now to the drawings, wherein like reference numerals refer to like parts throughout the several viewd, an elongate barge-like floating liquid storage vessel V comprises a pair of spaced longitudinally extending vertical side walls 1 and 2 and opposite pointed ends 3 and 4. Each of the side walls and the pointed ends comprise a plurality of generally rectangular plates 5 welded or otherwise suitably secured along their opposite edges to equally spaced, elongate, vertically disposed cylindrical buoyancy or floatation compartments 6 filled with a suitable buoyant material such as air, foam, perlite concrete and the like. The length of the buoyancy compartments 6 is the same as the height of the side walls 1 and 2 and the pointed ends 3 and 4.

The vessel V is divided into a plurality of storage compartments 7 by means of laterally extending bulkheads 8 welded or otherwise suitably secured at their opposite edges to alternate buoyancy compartments 6 in the opposite side walls 1 and 2.

In the embodiment of the invention shown in FIGS. 1 through 4, 6 and 7, every fifth bulkhead 9 is imperforate and divides the vessel V into a plurality of isolated sections A. Each of the intermediate bulkheads 8 has an opening 10 through the upper central portion thereof for flow of stored liquid between each of the compartments 7 within a section A. Each of the bulkheads 8 and 9 is of the same height as the height of the side walls 1 and 2 and pointed ends 3 and 4.

A plurality of pipes P extend longitudinally of the vessel V from a common manifold M, and respective ones of the pipes P terminate in the sections A for supplying liquid to be stored thereto. Liquid is supplied to the manifold M from a flexible hose or conduit C adapted to float on the surface of the body of water and extending from the manifold to a single point mooring means 11. A suitable hose or conduit 12 extends from the single point mooring means 11 to a pumping station or the like 13 in the floor of the body of water which is in communication through a still further pipe or conduit 14 with the drill site or well W or the like. The single mooring means 11 is moored in position in the body of water by suitable means such as a plurality of flexible mooring lines 15 connected at one end to the single point mooring means 11 and at their other end to suitable anchoring means such as shoes or piles 16 or the like in the floor of the body of water.

The vessel V is suitably secured or moored to the single point mooring means 11 by means of a single mooring line or cable or the like 17 connected to the end 4 of the vessel and to the single point mooring means 11. The mooring line 17 and hose or conduit C are connected with a suitable rotating or pivoting means 18 on the single point mooring means 11 so that the vessel V is enabled to rotate or weather vane about the single point mooring means 11 in response to changes in wind direction, currents and the like. The vessel V has an open top 19 and an open bottom 20, but the top of the vessel may be closed, if desired, by means of a cover means or roof R covering the top of the vessel as shown in FIG. 3, a portion of which is broken away to show the construction of the vessel.

Figure 6:
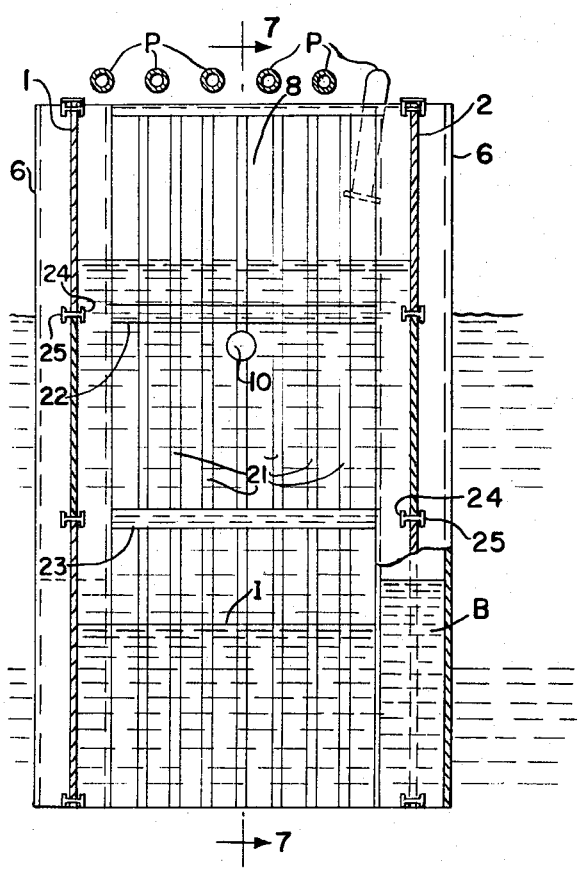
FIG. 6 is a sectional view taken along the line 6—6 in FIG. 5.
Figure 7:
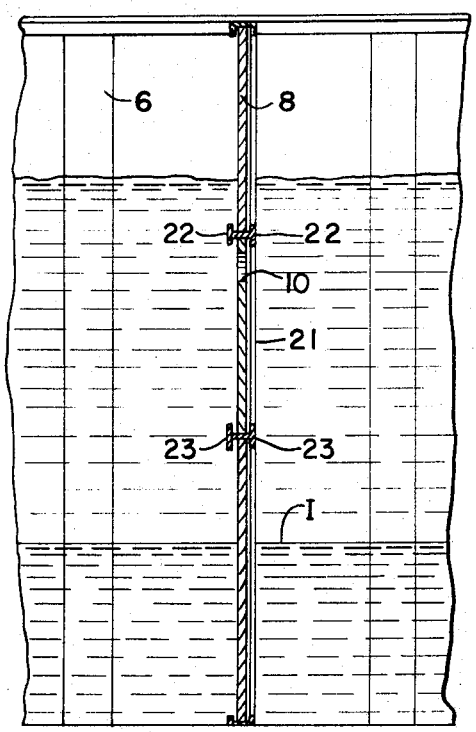
FIG. 7 is a sectional view taken along the line 7—7 in FIG. 6.

Referring now particularly to FIGS. 4, 6 and 7, details of construction of the side walls 1 and 2 and the bulkheads 8 and 9 can be seen. The construction of the pointed ends 3 and 4 is substantially the same as the construction of the side walls and description of the side walls will suffice for description of the pointed ends. A plurality of spaced, vertically disposed T-section stiffeners 21 are welded or otherwise suitably secured to opposite sides of each of the bulkheads 8 and 9 for stiffening the bulkheads. A pair of horizontally extending, T-section stiffening members 22 and 23 are also welded or otherwise suitably secured to opposite sides of each of the bulkheads 8 and 9 intermediate the top and bottom thereof. The side walls 1 and 2 are likewise suitably stiffened by means of a plurality of horizontally disposed, longitudinally extending T-section stiffening members 24 and 25 on the inside and outside, respectively, of each of the side walls 1 and 2. Any other suitable stiffening means than that shown could be provided on the bulkheads and side walls if desired to stiffen the bulkheads and side walls.

Referring now to FIG. 5, a modification of the invention is shown, and in this form of the invention, the construction of the vessel is identical in every respect with the construction of the vessel illustrated and described with reference to FIGS. 1 through 4, 6 and 7 except that each bulkhead 9 is imperforate and each compartment 7 defined by the bulkheads 9 and side walls 1 and 2 is separated from the other. A separate pipe P terminates in communication with each of the compartments 7 for supplying liquid to be stored thereto from the manifold M.

A suitable valve means 26 is disposed in each of the pipes P in both the FIG. 1 and FIG. 5 embodiments for controlling flow of liquid through the pipes and a sensing means 27 is associated with each of the valves 26 for determining the pressure drop across the valves to automatically close the valves in the event of a leak in the compartment being supplied by that pipe.

The bulkheads, side walls and buoyancy cylinders or compartments may be made of any suitable steel alloy, aluminum or other material, as desired.

By way of specific example, a vessel in accordance with the present invention is approximately 1,250 feet long, 100 feet high and 50 feet wide; each of the buoyancy cylinders or compartments is approximately 10 feet in diameter and 100 feet long and the vessel has a draft of 70 feet when in use. It is not essential that the vessel be moored to the single point mooring means 11, but the vessel could be moored directly to the floor of the body of water without changing its function. Further, the buoyancy means need not comprise vertical cylinders in the side walls, but could comprise horizontal cylinders running the length of the side walls, or the side walls might be designed as a double shell with the void thus created between the shells providing the buoyancy, or the buoyancy compartments could assume any configuration and need not be cylindrical. The height of the vessel is selected to prevent spillage of stored liquid caused by the pitch, heave and roll motion of the vessel and the rise and fall of the contained liquid.

In operation, the vessel is assembled on shore and then towed to the site of intended use and moored. The vessel is lowered to its operative position in the body of water by flooding the lower portion of at least some of the buoyancy compartments 6 with liquid ballast B. Liquid to be stored is then pumped into the vessel through the pipes P into the various compartments 7, and as the height of stored liquid increases in each of the compartments, its weight displaces water in the vessel through the open bottom thereof into the surrounding body of water, the open bottom comprising means for establishing fluid communication between the interior of the vessel and the surrounding body of water so that water can flow freely out of and into said vessel as iquid to be stored is added to or removed from the vessel.

The positioning of the opening 10 adjacent the upper portion of the bulkheads 8 insures that the liquid will flow from one compartment 7 into an adjacent compartment 7 in each of the sections A at substantially all levels of stored liquid in the compartments.

As seen in FIGS. 6 and 7, the interface I between the stored liquid and the water is substantially above the open bottom of the vessel and the top level or surface of the stored liquid is below the open top of the vessel. In the event of a leak or the like in one or more of the compartments 7, the sensor 27 in the pipe supplying that compartment will sense a pressure drop and operate the valve 26 to cut off the supply of liquid to that compartment.

The open communication between the inside of the vessel and the surrounding body of water equalizes the pressures inside the vessel with the pressure exerted thereon by the surrounding body of water by insuring that the vessel is substantially filled with liquid at all times regardless of the amount of liquid stored therein.

While the cover means or roof R has been shown as on the top of the vessel, it could comprise a floating cover means floating on the stored product, if desired. Moreover, the vessel may be made with no dividing bulkheads, if desired, or the vessel could have one or more bulkheads dividing the interior of the vessel into only one section A rather than a plurality of sections, as aforedescribed, particularly if the vessel is to be moored in a relatively small body of water such as a river or the like, as opposed to being moored in a large body of water, such as the sea.

As the invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. An elongate, barge-like, bottomless floating storage vessel for floating at the surface of a body of water, said vessel having a pair of opposed, generally vertical side walls, and at least one streamlined end, said bottomless vessel enabling water to flow back and forth between an interior of the vessel and the body of water as material to be stored is added to and removed from said vessel, the side walls each having an upper edge projecting above the surface of the body of water and a lower edge extending below the surface of the body of water, a plurality of transverse bulkheads connected between the side walls and dividing the vessel into a plurality of storage compartments, the horizontal length of said side walls between said opposite ends being substantially greater than the transverse distance between the side walls so as to present a reduced transverse cross-sectional area, buoyancy means fixedly secured directly to the side walls and of such size and buoyancy as to float said vessel at the surface of the body of water, pump means and conduit means connected with the compartments to transfer stored product between the compartments and mooring means connected to said streamlined end of said vessel and enabling said vessel to move or weather vane about said mooring means in response to changes in direction of wind and currents and the like, and thus enabling use of less materials and a more economical construction of the vessel than in prior art devices while providing comparable storage space to prior art devices.

2. A floating storage vessel as in claim 1, wherein said vessel has an open top.

3. A floating storage vessel as in claim 1, wherein said side walls comprise a plurality of welded together rectangular plates, and said buoyancy means comprises a plurality of tubular, closed, vertically extending floatation compartments welded in said side walls between adjacent edges of at least some of said plates.

4. A floating storage vessel as in claim 1, wherein said vessel includes cover means for covering the product stored in said vessel.

5. A floating storage vessel as in claim 1, wherein said mooring means comprises a flexible means connected at one end to said streamlined end of said vessel and at the other end to a single point mooring means.

6. A floating storage vessel as in claim 5, wherein said single point mooring means comprises a floatable means, said floatable means being moored to the floor of the body of water by flexible mooring lines or the like.

7. A floating storage vessel as in claim 6, wherein said single point mooring means has a rotatable means thereon, said flexible lines being connected to said rotatable means so that said vessel and said rotatable means rotate relative to said single point mooring means in response to changes in direction in wind, currents and the like.

8. A floating storage vessel as in claim 2, wherein said opposite ends are pointed.

9. A floating storage vessel as in claim 8, wherein said vessel is divided into a plurality of individual storage compartments by means of laterally extending bulkheads connected between the opposite inner sides of said vessel.

10. A floating storage vessel as in claim 9, wherein said vessel is used for storing liquid, at least some of said bulkheads having openings therethrough for flow of liquid between adjacent compartments.

11. A floating storage vessel as in claim 10, wherein said buoyancy means comprises a plurality of buoyancy compartments connected to said side walls.

12. A floating storage vessel as in claim 10, wherein a plurality of adjacent compartments are in fluid communication with one another, said plurality of compartments being isolated by an imperforate bulkhead from other adjacent plurality of compartments in fluid communication with one another.

13. A floating storage vessel as in claim 12, wherein stiffener means are on each of said side walls and on said bulkheads.

14. An elongate, barge-like floating storage vessel for floating at the surface of a body of water, said vessel having a pair of opposed, elongate, generally vertical side walls, opposite pointed ends, an open top, and an open bottom to enable water to flow back and forth between an interior of the vessel and the body of water as material to be stored is added to and removed from said vessel, the horizontal length of said side walls between said opposite ends being substantially greater than the transverse distance between the side walls so as to present a reduced transverse cross-sectional area, a plurality of laterally extending bulkheads connected between the opposite inner sides of the vessel and dividing the vessel into a plurality of individual storage compartments for storing liquid, at least some of said bulkheads having openings therethrough for flow of liquid between adjacent compartments, a plurality of closed, vertically extending, cylindrical buoyancy compartments connected in said side walls and of such size and buoyancy as to float said vessel at the surface of the body of water, and mooring means connected to one end of said vessel and enabling said vessel to move or weather vane about said mooring means in response to changes in direction of wind and currents and the like, and thus enabling use of less materials and a more economical construction of the vessel than in prior art devices while providing comparable storage space to prior art devices.

15. A floating storage vessel as in claim 14, wherein ballast means is in at least some of said buoyancy compartments.

16. A floating storage vessel as in claim 15, wherein pipe means extends from a common manifold means to each of said compartments for conveying liquid to be stored from a source to each of said compartments.

17. A floating storage vessel as in claim 15, wherein each of said buoyancy compartments is filled with air.

18. A floating storage vessel as in claim 15, wherein each of said buoyancy compartments is filled with foam.

19. A long, narrow, floatable oil storage vessel of considerably greater length than width, including opposite ends and opposite, connected together, spaced apart vertical side walls, said side walls comprising a plurality of welded together steel plates, a plurality of individual, vertically extending, tubular buoyancy compartments welded in said side walls at spaced intervals along the length of the side walls between adjacent edges of at least some of said plates and said buoyancy compartments being substantially commensurate in height with the height of the side walls, said buoyancy compartments of such size and buoyancy as to float the vessel at the surface of a body of water, a plurality of spaced apart bulkheads extending transversely between the side walls and welded at their opposite edges to buoyancy compartments at opposite sides of the vessel, and mooring means secured to one end of the vessel for mooring the vessel in a body of water to enable the vessel to weathervane about said mooring means.

* * * * *